US011412659B2

(12) United States Patent
Hession et al.

(10) Patent No.: US 11,412,659 B2
(45) Date of Patent: Aug. 16, 2022

(54) ACTIVE BACKSHEET FOR A GRAIN HEADER

(71) Applicant: CNH Industrial America LLC, New Holland, PA (US)

(72) Inventors: Adam L. Hession, Davenport, IA (US); Cory Conway, Maquoketa, IA (US)

(73) Assignee: CNH Industrial America LLC, New Holland, PA (US)

( * ) Notice: Subject to any disclaimer, the term of this patent is extended or adjusted under 35 U.S.C. 154(b) by 274 days.

(21) Appl. No.: 16/742,319

(22) Filed: Jan. 14, 2020

(65) Prior Publication Data

US 2021/0212258 A1 Jul. 15, 2021

(51) Int. Cl.

| *A01D 61/02* | (2006.01) |
| *A01D 41/14* | (2006.01) |
| *A01D 57/20* | (2006.01) |
| *A01D 61/00* | (2006.01) |
| *A01D 43/06* | (2006.01) |
| *A01D 43/08* | (2006.01) |

(52) U.S. Cl.
CPC ............. *A01D 61/02* (2013.01); *A01D 41/14* (2013.01); *A01D 57/20* (2013.01); *A01D 61/002* (2013.01); *A01D 43/06* (2013.01); *A01D 43/086* (2013.01)

(58) Field of Classification Search
CPC ........ A01D 61/02; A01D 41/14; A01D 57/20; A01D 61/002; A01D 43/06; A01D 43/086
See application file for complete search history.

(56) References Cited

U.S. PATENT DOCUMENTS

| 454,225 | A | * | 6/1891 | Patterson | ............... | A01D 45/10 56/14.5 |
| 1,906,498 | A | * | 5/1933 | Templeton | ............. | A01D 57/22 56/192 |
| 2,867,958 | A | * | 1/1959 | Allen | ..................... | A01D 41/16 56/15.7 |

(Continued)

FOREIGN PATENT DOCUMENTS

| CA | 2606003 A1 | 4/2009 |
| CN | 107347368 A | 11/2017 |

(Continued)

OTHER PUBLICATIONS

Extended European Search Report for EP Application No. 21151682.8 dated May 18, 2021 (six pages).

*Primary Examiner* — Arpad Fabian-Kovacs
(74) *Attorney, Agent, or Firm* — Peter Zacharias; Patrick Sheldrake

(57) ABSTRACT

An agricultural vehicle header includes a frame, a front conveyor, and a rear conveyor. The frame extends in a lateral direction from a first end to a second end and has a leading edge, and a feeder housing opening positioned behind the leading edge with respect to a forward direction. The front conveyor is attached to the frame behind the leading edge with respect to the forward direction, and includes a front movable surface configured to move an adjacent portion of crop material towards the feeder housing opening. The rear conveyor is attached to the frame behind the front conveyor, and has a rear belt having an operative surface that faces in the forward direction and is configured to move an adjacent portion of crop material towards the feeder housing opening.

21 Claims, 4 Drawing Sheets

(56) References Cited

U.S. PATENT DOCUMENTS

| | | | | |
|---|---|---|---|---|
| 4,487,004 A * | 12/1984 | Kejr | .................. | A01D 41/14 |
| | | | | 56/14.4 |
| 7,802,417 B2 * | 9/2010 | Sauerwein | ............. | A01D 43/06 |
| | | | | 56/181 |
| 9,750,189 B2 * | 9/2017 | Honey | .................. | A01D 57/02 |
| 9,750,190 B2 | 9/2017 | Mossman | | |
| 10,477,770 B2 * | 11/2019 | Modak | ................ | A01D 41/142 |
| 10,820,515 B2 * | 11/2020 | Washburn | ............... | A01D 43/06 |
| 2015/0156969 A1 * | 6/2015 | Mossman | ............. | A01D 57/20 |
| | | | | 56/153 |
| 2016/0242358 A1 | 8/2016 | Mossman | | |
| 2017/0208738 A1 * | 7/2017 | McCrea | ................ | A01D 41/14 |

FOREIGN PATENT DOCUMENTS

| | | | |
|---|---|---|---|
| EP | 2764765 | A1 | 8/2014 |
| EP | 3427565 | A1 | 1/2019 |
| EP | 3466241 | A1 | 4/2019 |

\* cited by examiner

ACTIVE BACKSHEET FOR A GRAIN HEADER

BACKGROUND OF THE INVENTION

Agricultural combines are machines that gather crop materials and separate the desirable crop (grain, seeds, etc.) from the discardable material (straw, tailings, etc.). To do so, the combine typically collects all of the crop materials using a system including a header and a feeder. The header gathers a wide swath of crop material from the ground, and moves it towards the feeder. The feeder conveys the consolidated crop materials to the threshing and separating system, which separates the desirable crop from the remaining material.

A typical combine header extends laterally to gather a wide swath of crop from multiple rows of plants, and the entire volume of crop material must be directed centrally to enter the feeder. Thus, increasing the width of the header requires a corresponding increase in lateral feed rate towards the central feeder in order to maintain the same ground speed.

Known headers use a variety of different conveying system to move the crop materials to the central feeder. For example, draper belts or augers may be provided to extend from the lateral end regions of the header towards the central feeder. The inventors have determined that the state of the art of such feeder systems can be improved.

This description of the background is provided to assist with an understanding of the following explanations of exemplary embodiments, and is not an admission that any or all of this background information is necessarily prior art.

SUMMARY OF THE INVENTION

In one exemplary embodiment, there is provided a header for an agricultural vehicle. The header has a frame, a first front conveyor, and a first rear conveyor. The frame extends in a lateral direction from a first frame end to a second frame end, and has a leading edge, and a feeder housing opening positioned behind the leading edge with respect to a forward direction. The feeder housing opening is between the first frame end and the second frame end. The first front conveyor is attached to the frame and extends in the lateral direction between the first frame end and the feeder housing opening and behind the leading edge with respect to the forward direction. The first front conveyor has a first front movable surface configured to move an adjacent portion of crop material towards the feeder housing opening. The first rear conveyor is attached to the frame and extends in the lateral direction between the first frame end and the feeder housing opening and behind the first front conveyor with respect to the forward direction. The first rear conveyor has a first rear belt having a respective operative surface facing in the forward direction and configured to move an adjacent portion of crop material towards the feeder housing opening.

In some aspects, the first front conveyor may be a first front belt having a respective operative surface facing in an upwards direction.

In some aspects, the respective operative surface of the first rear belt is located above the respective operative surface of the first front belt with respect to a vertical direction. The respective operative surfaces of the first rear belt and the first front belt may be oriented at an angle of 90° to 135° relative to one another, as viewed along the lateral direction.

In some aspects, the first front conveyor and the first rear conveyor each may have a respective continuous belt.

In some aspects, the first front conveyor may have a continuous belt, and the first rear conveyor may have an interrupted belt.

In some aspects, the first front conveyor may have a first front auger having a helical respective operative surface. In such aspects, the first rear conveyor may have a continuous belt or an interrupted belt.

In some aspects, the header further includes a second front conveyor and a second rear conveyor. The second front conveyor is attached to the frame and extends in the lateral direction between the second frame end and the feeder housing opening and behind the leading edge with respect to the forward direction. The second front conveyor has a second front movable surface configured to move an adjacent portion of crop material towards the feeder housing opening. The second rear conveyor is attached to the frame and extends in the lateral direction between the second frame end and the feeder housing opening and behind the second front conveyor with respect to the forward direction. The second rear conveyor has a second rear belt having a respective operative surface facing in the forward direction and configured to move an adjacent portion of crop material towards the feeder housing opening. In such aspects, the first front conveyor and the second front conveyor may each have an auger or a belt.

Also provided is an agricultural vehicle having a chassis configured for movement on a surface, a feeder housing having a proximal end mounted to the chassis and a distal end located in a forward direction from the proximal end, and a header mounted on the distal end of the feeder housing. The header may be in accordance with the first exemplary aspect and examples described above.

BRIEF DESCRIPTION OF THE DRAWINGS

Embodiments of inventions will now be described, strictly by way of example, with reference to the accompanying drawings, in which.

In the figures, like reference numerals refer to the same or similar elements.

DETAILED DESCRIPTION OF THE DRAWINGS

Figure 1:
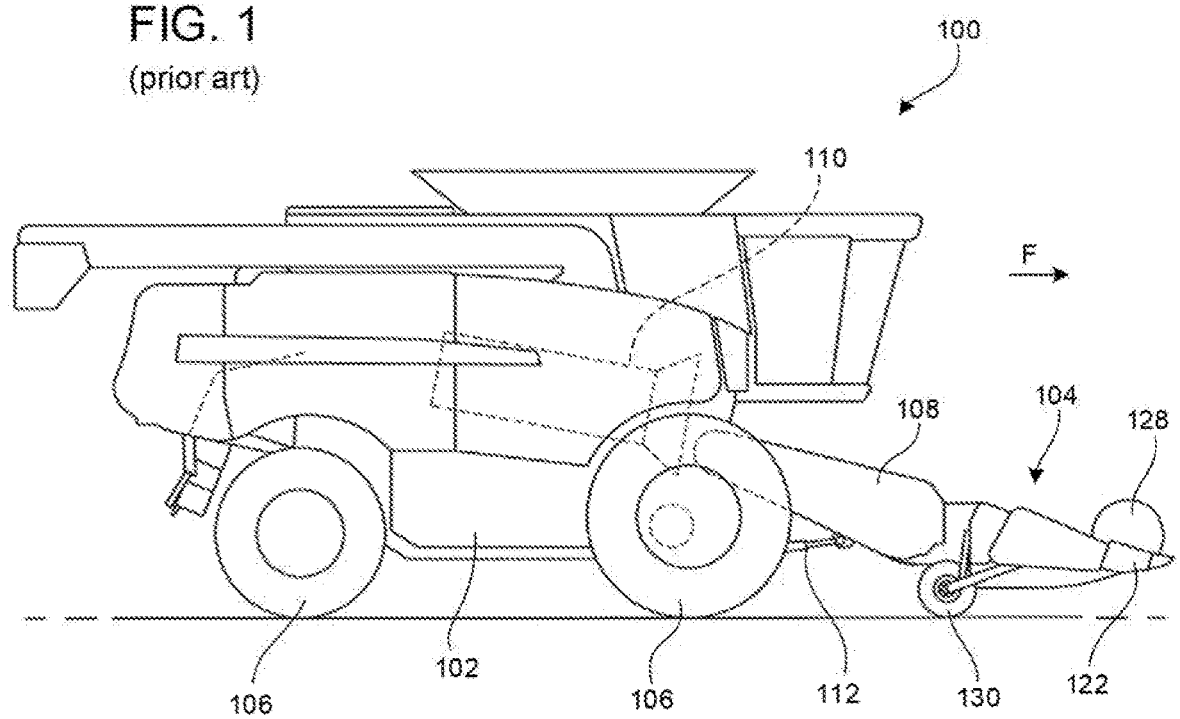
FIG. 1 is a side view of an example of an agricultural vehicle having a header.

The drawing figures depict one or more implementations in accordance with the present concepts, by way of example only, not by way of limitations. The examples are shown in conjunction with an agricultural combine harvester, but have applicability in any similar agricultural vehicle, such as a windrower.

Figure 2:
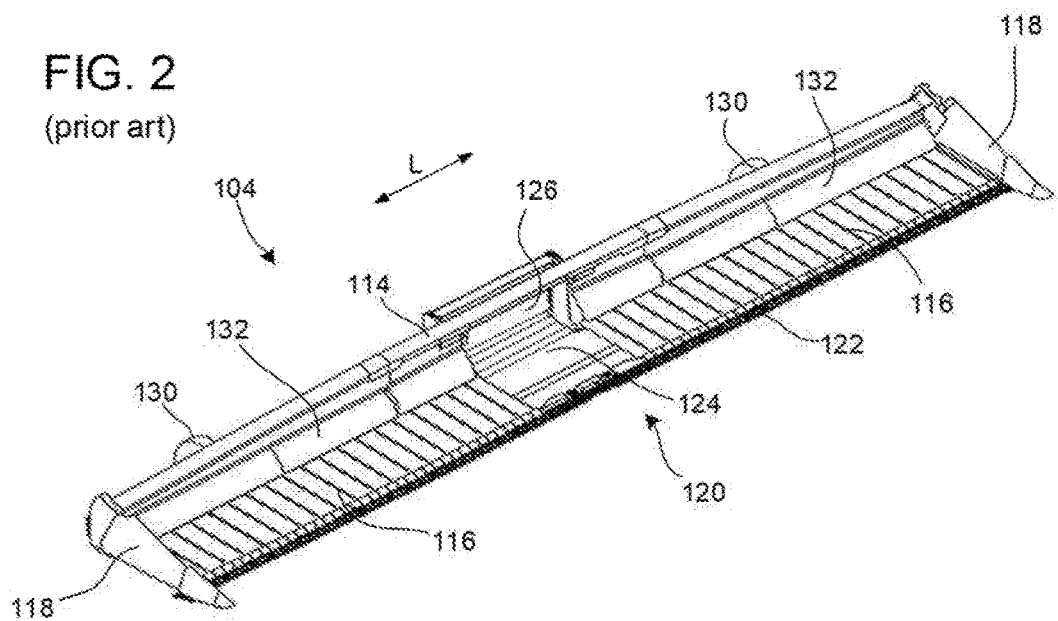
FIG. 2 is an isometric view of the header of the vehicle of FIG. 1.

Referring now to the FIGS. 1 and 2, there is shown an exemplary embodiment of an agricultural vehicle 100 in the form of a combine harvester which generally includes a chassis 102 and a header 104 carried by the chassis 102. The chassis 102 is supported on driving wheels 106 (e.g., tracked wheels or pneumatic tires), as known in the art. The vehicle 100 is configured to move in a forward direction, illustrated as arrow F, during harvesting operations.

The header 104 is connected to the chassis 102 by a feeder housing 108, which includes a conveyor configured to collect crop material and direct it to a threshing and separating system 110 inside the vehicle 100, such as known in the art. The feeder housing 108 may be a simple rigid connection or an articulated connection comprising one or more linkage arms and/or feeder housing actuators 112 (e.g., hydraulic pistons/cylinder actuators) that operate as housing position control mechanisms, as known in the art.

The header 104 is mounted to the feeder housing 108, and extends in a lateral direction L that is transverse to the forward direction F. A frame 114 provides the main structural support for the header 104. The frame 114 may comprise any arrangement of structural beams and supports, as known in the art. The frame 114 may comprise a single unitary section, or it may have articulated wing sections, as known in the art.

In the embodiment of FIG. 2, the header 104 comprises a so-called draper head, having left and right crop conveyors in the form of draper belts 116. Each belt 116 is operated by a motor and drivetrain (not shown), such as a hydraulic or electric motor and associated belts, pulleys or gears, or a power take-off from the vehicle's prime mover engine. The belts 116 are driven such that their respective upper spans move from the lateral ends 118 of the header 104 towards the center 120 of the header 104. It will be appreciated that each conveyor may comprise multiple belt sections that are placed end-to-end, such as in a header having articulating wing sections. The upper span of each belt 116 faces generally upwards (i.e., the belt surface is horizontal or close to horizontal), such that the belts 116 support the crop material in the vertical direction.

The header 104 may also include other conventional devices. For example, the header 104 may have a cutter bar 122 that is located at the forward edges of the belts 116 to sever crop material from the ground. The header 104 also may have a feeder belt 124 that is located in front of the feeder housing opening 126 and configured to pull the crop material backwards into the feeder housing opening 126. Other typical devices are one or more reels 128 that rotate to sweep crop material towards the belts 116, 124, gauge wheels 130 or skids to support the header 104 on the ground, and so on.

In a typical draper head, a backsheet 132 is provided at the rear edges of the belts 116 to prevent crop material from moving further backwards as it is conveyed laterally to the feeder housing 108.

Figure 3:
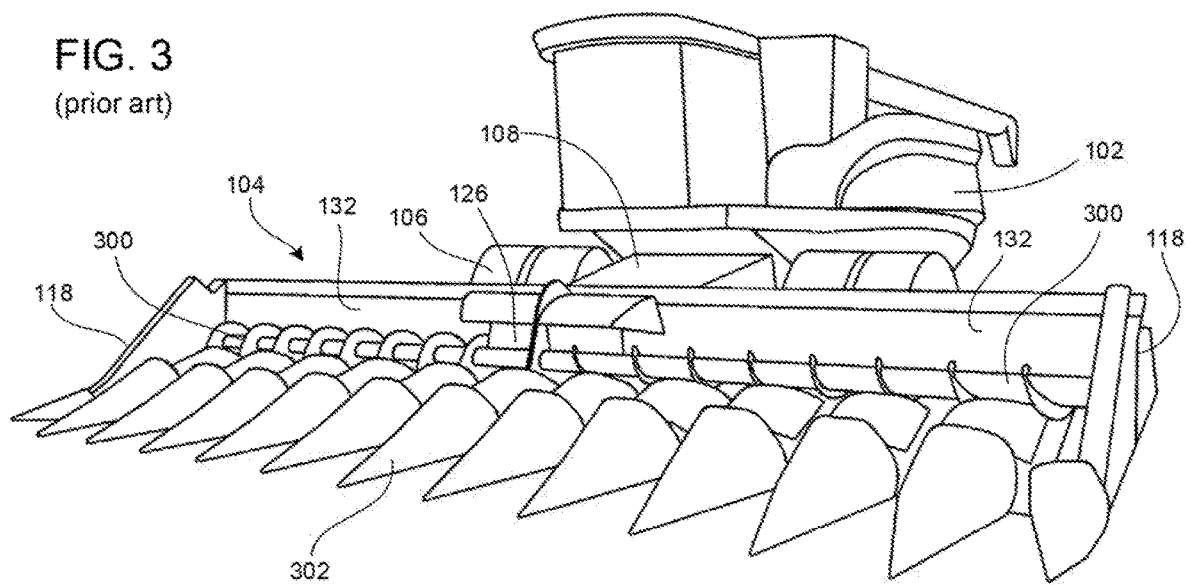
FIG. 3 is a perspective view of another agricultural vehicle having a header.

FIG. 3 shows another agricultural vehicle 100 having a header 104. In this case, the header 104 has lateral crop conveying mechanisms in the form of left and right augers 300. The augers 300 are operated by suitable hydraulic or electric motors, or they may be powered from a power take-off from the vehicle's prime mover engine. One or more augers 300 may be provided on each side of the feeder housing 108. The augers 300 also may terminate immediately in front of the feeder housing opening 126, obviating the need for a feeder belt 124. As with the embodiment of FIG. 2, a backsheet 132 is located behind the augers 300 to prevent crop material from passing backwards as the augers rotate to convey the crop material to the feeder housing 108. This header 104 also includes other typical features, such as crop row separators 302.

In both of the foregoing cases, the static backsheet 132 provides a simple and inexpensive structure to contain the crop material movement during harvesting. However, it is believed that the backsheet 132 can limit efficiency and potentially cause crop damage. For example, crop material that becomes heavily stacked on the belts or augers can press against the backsheet 132, generating friction that resists movement towards the feeder housing 108 and increasing power requirements for the belt or auger motors. Such packing can also lead to significant shear forces being applied to the crop material, which can lead to generating dense clumps of material that feed inconsistently into the feeder housing 108 and threshing and separating system 110.

It is expected that header operation can be improved by replacing all or some of the static backsheet 132 with an active component that operates to direct the crop material towards the feeder housing 108. Non-limiting examples of such devices are described in the following embodiments.

Figure 4:
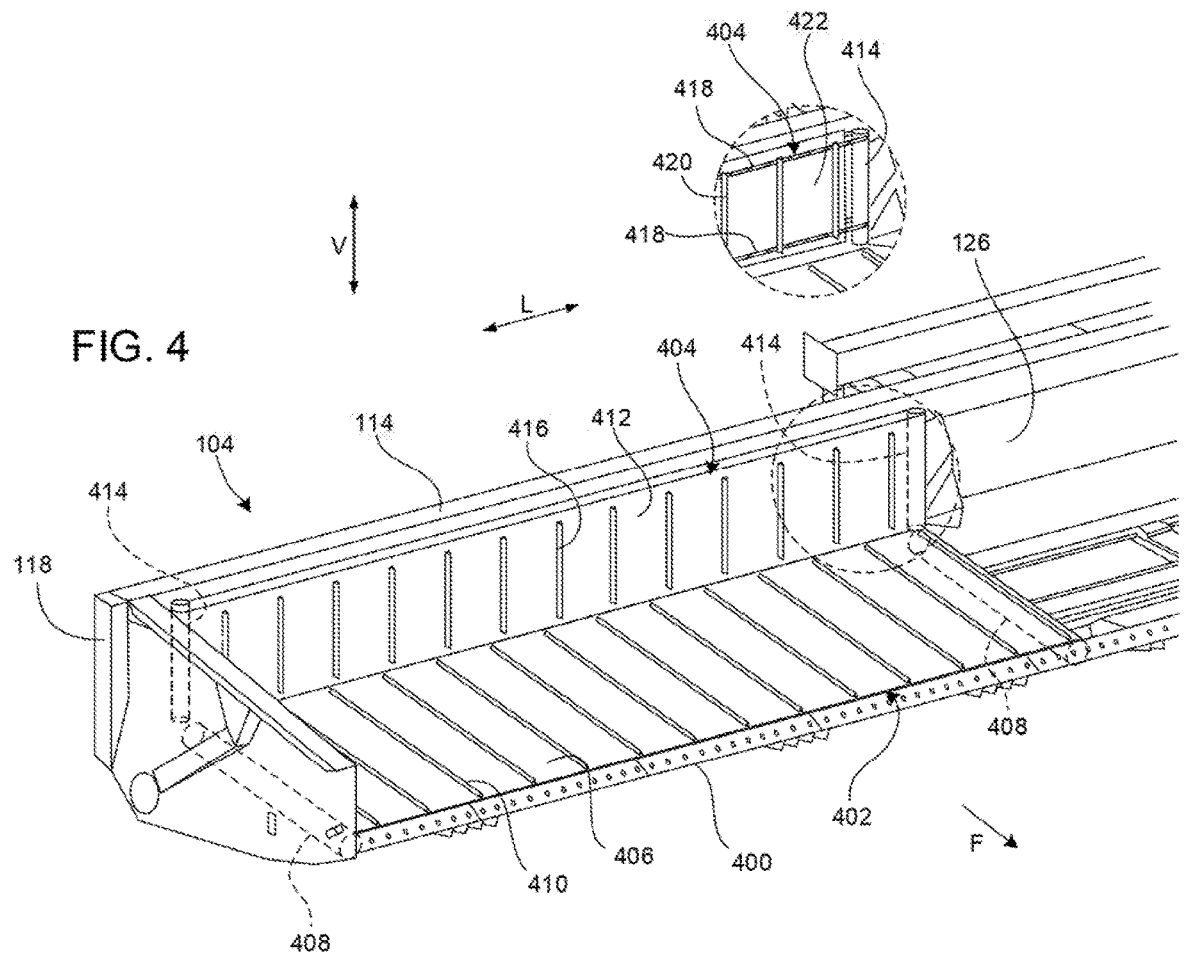
FIG. 4 is perspective view showing a portion of an agricultural vehicle header having an active backsheet.

FIG. 4 illustrates a first example of a header 104, which is shown with outer fairings and covers removed to expose the frame 114. For simplicity, only the right half (as viewed from behind) of the header 104 is shown. The frame 114 extends in the lateral direction L from a first frame end 118 to a second frame end (see, e.g., FIG. 2), and has a feeder housing opening 126 located between the ends 118. The frame 114 preferably is symmetrical, with the feeder housing opening 126 being located at a longitudinal centerline of the header 104, but this is not strictly required. The frame 114 may include any suitable structural assembly of parts, such as welded or fastened members having a variety of fixtures and fittings mounted thereto. The frame 114 also may be divided into subframes for different sections of the header 104, such as separate subframes for articulated wing sections or the like. The details of a suitable frame 114 construction will be understood without need for further explanation herein.

The frame 114 extends in the forward direction F to a leading edge 400, which typically comprises a cutter bar 122, an arrangement of crop dividers 302, and/or other known features for addressing crop material during the initial entry into the header 104. The frame 114 also preferably includes features for securing the frame 114 to a feeder housing 108, such as hooks, bolt holes, and the like. Such features conveniently are located proximal to the feeder housing opening 126, but this is not strictly required. One or more gauge wheels, skids, actuators, height sensors, or other known header devices may be attached to the frame 114.

The frame 114 includes one or more front conveyors 402, and one or more rear conveyors 404.

Each front conveyor 402 is attached to the frame 114 and extends in the lateral direction L between the first frame end 118 and the feeder housing opening 126. The front conveyors 402 stop short of the feeder housing opening 126, or they may extend far enough to overlap the feeder housing opening 126 in the forward direction F. The front conveyors 402 are located behind the leading edge 400 with respect to the forward direction F. A feeder belt 124 (see, e.g., FIG. 2) may be located at the end of the front conveyor 402 and in front of the feeder housing opening 126.

Each front conveyor 402 comprises a movable surface that is configured to move adjacent crop material towards the feeder housing opening 126. In the example of FIG. 4, the movable surface comprises a belt 406 that is supported on two or more rollers 408, such as in a conventional draper belt system. The belt 406 may include one or more ribs 410 to assist with moving the crop material. The belt 406 is driven by an associated motor, such as a hydraulic or electric motor or a power take-off from a remote power supply. Any suitable arrangement of gears, pulleys, belts and the like may be used to transmit power from the motor to the belt 406. In use, the belt 406 is driven such that it's operative surface (i.e., the portion of the surface facing the crop material at any given time) moves towards the feeder housing opening 126.

The belt 406 may comprise a continuous belt that does not have any openings through it, such as shown in FIG. 4. Such a continuous belt 406 may be formed, for example, by a band of fabric or polymeric material that extends in a continuous loop between the outermost rollers 408. Alternatively, the belt 406 may comprise an interrupted belt formed by spaced-apart chains with paddles mounted between the chains to move along the belt path, or the like.

The front conveyors 402 are oriented such that their operative surfaces are facing in an upwards direction. As used herein, facing in the upwards direction means that the operative surface is oriented such that a normal vector extending orthogonally from the operative surface is oriented at an angle of less than 45° from the global vertical direction (i.e., the gravitational direction). In use, the specific angle of the front conveyors 402 may change as the frame moves over the ground, particularly if the front conveyors 402 are mounted on floating suspension arms that connect the back of the frame 114 to the leading edge 400, but in normal use the front conveyors 402 will remain facing in the upwards direction.

Each rear conveyor 404 is attached to the frame 114 behind an adjacent front conveyor 402 with respect to the forward direction F. The rear conveyors 404 extend in the lateral direction between the first frame end 118 and the feeder housing opening 126, and may stop short of the feeder housing opening 126, or overlap the feeder housing opening 126 with respect to the forward direction F.

Each rear conveyor 404 comprises a movable belt 412 that is configured to move adjacent crop material towards the feeder housing opening 126. The belt 412 may be mounted on two or more rollers 414 that are attached to the frame 114. The belt 412 also may include ribs 416 to assist with moving the crop material. The belt 412 is driven by an associated motor, such as a hydraulic or electric motor or a power take-off from a remote power supply. Any suitable arrangement of gears, pulleys, belts and the like may be used to transmit power from the motor to the belt 412. In use, the belt 412 is driven such that it's operative surface (i.e., the portion of the surface facing the crop material at any given time) moves towards the feeder housing opening 126. The belt 412 of the rear conveyor 404 may be driven at the same linear speed as the belt 406 of the front conveyor 402, but this is not strictly required.

The belt 412 may comprise a continuous belt that does not have any openings through it, such as shown in FIG. 4. Such a continuous belt 406 may be formed, for example, by a band of fabric or polymeric material that extends in a continuous loop between the outermost rollers 414. Alternatively, the belt 412 may comprise an interrupted belt formed by spaced-apart chains 418 or narrow belts with paddles 420 mounted between them to move along the belt path, or the like. Such an embodiment is shown in the inset circled portion of FIG. 4. The operative surface for embodiments having an interrupted belt is an imaginary surface extending between the chains 418 or belts. Because the interrupted belt has openings, backer plates or a backsheet 422 may be located between the operative surface and the portion of the belt traveling away from the feeder housing opening 126.

The rear conveyors 404 are oriented such that their operative surfaces are facing in a forward direction. As used herein, facing in the upward direction means that the operative surface is oriented such that a normal vector extending orthogonally from the operative surface is oriented at an angle of less than 45° from the forward direction F (i.e., the horizontal direction of movement on level ground). In use, the specific angle of the rear conveyors 404 may change as the frame moves over the ground, particularly if the rear conveyors 404 are mounted on floating suspension arms that connect the back of the frame 114 to the leading edge 400, but in normal use the rear conveyors 404 will remain facing in the upwards direction.

As shown in FIG. 4, the operative surface of the rear conveyor 404 may be located generally above the operative surface of the front conveyor 402 with respect to the vertical direction V. Thus, the rear conveyor 404 and front conveyor 402 provide a partially enclosed space that holds the incoming crop material from the back and the bottom. Simultaneously, the conveyors 402, 404 move the crop material towards the feeder housing opening 126. The angle between the operative surfaces of the front conveyor 402 and rear conveyor 404 may be selected according to any desired criteria. For example, increasing the angle potentially enlarges the volume of crop material that can be handled by the conveyors 402, 404, but may require the header 104 to be longer in the forward direction F. Decreasing the angle can minimize the fore-aft dimension of the header 104, but might reduce the volume of space for holding the crop material. As another example, increasing the angle, such as by tilting the rear conveyor 404 back, can increase the amount of vertical load on the rear conveyor 404, which might be beneficial to increase friction with the crop and thus movement of the crop material along the rear conveyor 404. Conversely, the rear conveyor 404 can be oriented to face more forward, and larger ribs 416 or paddles 420 provided to increase mechanical interaction with the crop to help move the crop material along the rear conveyor 404. Other alternatives and variations will be apparent to persons of ordinary skill in the art in view of the present disclosure.

Figure 5:
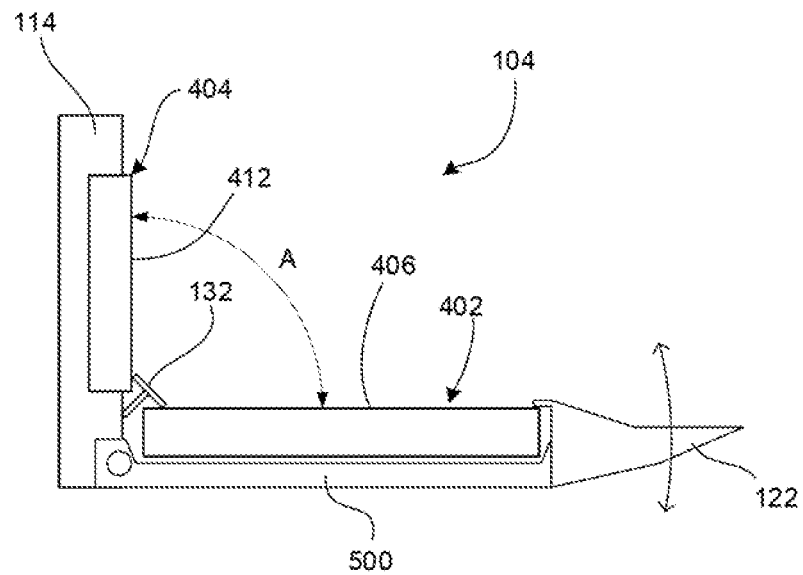
FIG. 5 is schematic side view of another agricultural vehicle header having an active backsheet.

Referring to FIG. 5, in one embodiment, the respective operative surfaces of the first rear belt 412 and the first front belt 406 are oriented at an angle A of 90° to 135° relative to one another in a resting position, as viewed along the lateral direction. A partial backsheet 132 may be provided to cover a gap between the front conveyor 402 and the rear conveyor 404. In addition, the frame 114 may comprise draper arms 500 that extend to a cutter bar 122 at the leading edge of the frame 114. The draper arms 500 hold the front conveyor 402, such that the front conveyor 402 can move through an arc of travel, as shown by the double-headed arrow. During use, the angle between the belts 406, 412 may change from the resting position.

Figure 6:
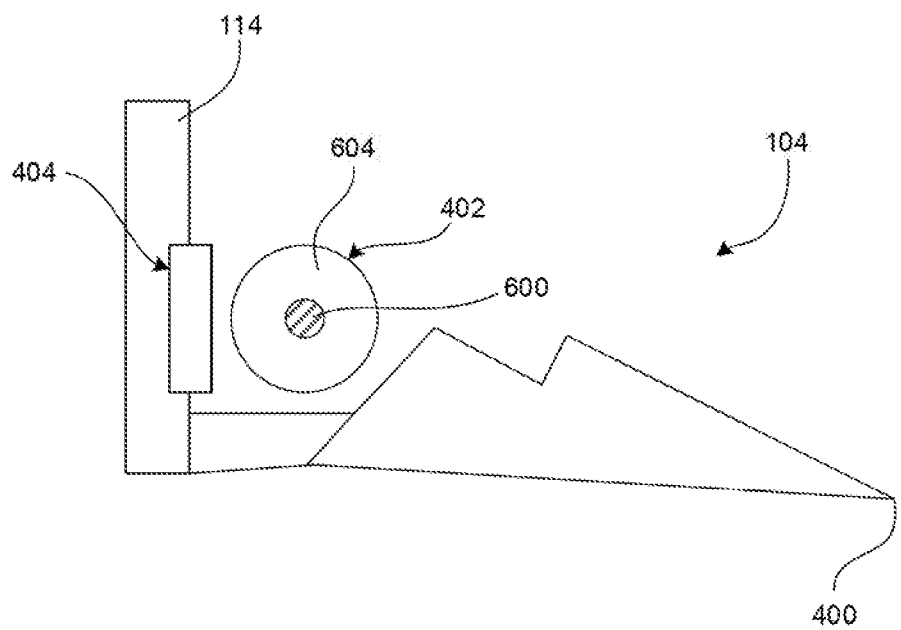
FIG. 6 is schematic side view of another agricultural vehicle header having an active backsheet.

FIG. 6 illustrates another embodiment of a header 104 having a front conveyor 402 in the form of an auger, and a rear conveyor 404. The auger is located behind the leading edge 400 of the header 104, and comprises a central shaft 602 to which a helical operative surface 604 is attached. The shaft 602 and operative surface 604 extend generally in the lateral direction from an end of the header towards the feeder housing outlet 126, such as shown in FIG. 3. Rotation of the shaft 602 causes the helical surface 604 to rotate, and thereby forces crop material towards the feeder housing outlet 126.

The rear conveyor 404 is located behind the auger, and may comprise a continuous or interrupted belt. The rear conveyor 404 may be located above the auger, but more preferably is located directly behind the auger so as to interact with the auger in a more direct manner to direct crop material towards the feeder housing outlet 126. For example, ribs or paddles of the rear conveyor 404 may extend towards the helical operative surface 604 of the auger to cooperate to move crop material. As another example, the ribs or paddles may intermesh with the helical operative surface 604 (i.e. extend within the radius of the helical operative surface's outer edge). Other alternatives and variations will be apparent to persons of ordinary skill in the art in view of the present disclosure.

Figure 7:
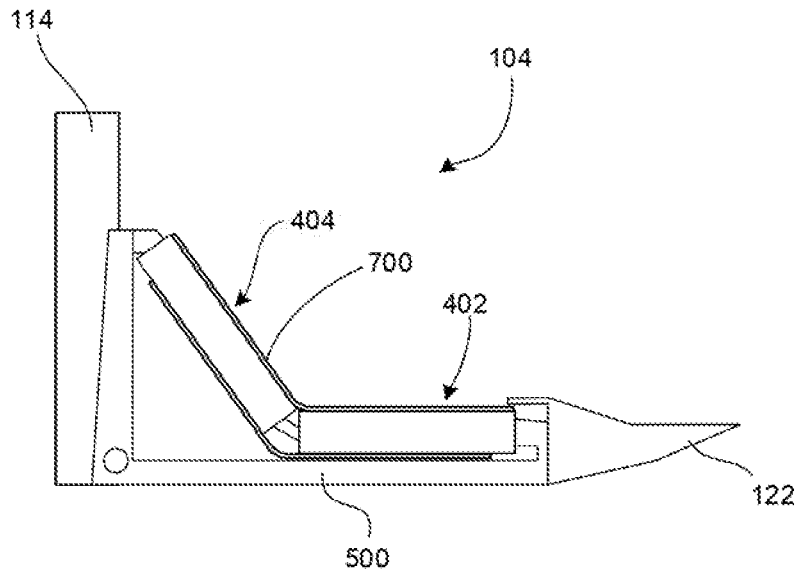
FIG. 7 is schematic side view of another agricultural vehicle header having an active backsheet.

Referring to FIG. 7, in another embodiment the front conveyor 402 and rear conveyor 404 may comprise a single unitary belt 700 having a front portion that wraps around front rollers 702 and a rear portion that wraps around rear rollers 704. The rear rollers 704 are angled upwards relative to the rear rollers 702, such that the front portion of the belt is generally horizontal, while the rear portion is angled upwards relative to the front portion. Thus, a single unitary belt 700 can form both a front belt and a rear belt.

It will be appreciated that embodiments may include any number of front conveyors 402 and rear conveyors 404. For example, an asymmetrical header 104 may only a single front conveyor 402 and a single rear conveyor 404 located on one side of the feeder housing outlet 126. have, which may be positioned on either side of the feeder housing outlet 126. Embodiments also may have different numbers of front conveyors 402 and rear conveyors 404, such as a single rear conveyor 404 located behind one or both of two different front conveyors 402. Embodiments also may have a combination of belts and augers as the front conveyors 402.

As will be appreciated from the foregoing, embodiments are expected to provide a benefit to the efficiency or operating capacity of headers by providing an "active" backsheet that helps convey crop material towards the feeder housing outlet 126. Embodiments may be provided in various forms. In one instance, an embodiment may comprise an entire vehicle and header assembly, and the control system may be integrated into the header or into the vehicle. In another instance, an embodiment may comprise a segmented header and an associated control system. In another instance, an embodiment may comprise a single header wing section and an associated control system. Other configurations may be used in other embodiments.

The present disclosure describes a number of inventive features and/or combinations of features that may be used alone or in combination with each other or in combination with other technologies. The embodiments described herein are all exemplary, and are not intended to limit the scope of the claims. It will also be appreciated that the inventions described herein can be modified and adapted in various ways, and all such modifications and adaptations are intended to be included in the scope of this disclosure and the appended claims.

The invention claimed is:

1. A header for an agricultural vehicle, the header comprising:
   a frame extending in a lateral direction from a first frame end to a second frame end, the frame having: a leading edge, and a feeder housing opening positioned behind the leading edge with respect to a forward direction and between the first frame end and the second frame end;
   a first front conveyor attached to the frame and extending in the lateral direction between the first frame end and the feeder housing opening and behind the leading edge with respect to the forward direction, the first front conveyor comprising a first front movable surface configured to move an adjacent portion of crop material towards the feeder housing opening; and
   a first rear conveyor attached to the frame and extending in the lateral direction between the first frame end and the feeder housing opening and behind the first front conveyor with respect to the forward direction, the first rear conveyor comprising a first rear belt having a respective operative surface facing in the forward direction and configured to move an adjacent portion of crop material towards the feeder housing opening,
   wherein respective operative surfaces of the first rear belt and the first front belt are oriented at an angle of 90° to 135° relative to one another, as viewed along the lateral direction, and said angle is adjustable.

2. The header of claim 1, wherein the first front conveyor comprises a first front belt having a respective operative surface facing in an upwards direction.

3. The header of claim 2, wherein the respective operative surface of the first rear belt is located above the respective operative surface of the first front belt with respect to a vertical direction.

4. The header of claim 1, wherein the first front conveyor is supported on a first roller positioned adjacent the feeder house opening and a second roller positioned adjacent the first frame end, and the first rear conveyor is supported on a third roller positioned adjacent the feeder house opening and a fourth roller positioned adjacent the first frame end, wherein said first and third rollers are positioned at or near a same lateral position in the lateral direction and said second and fourth rollers are positioned at or near a same lateral position in the lateral direction.

5. The header of claim 2, wherein the first front conveyor and the first rear conveyor each comprises a respective continuous belt.

6. The header of claim 2, wherein the first front conveyor comprises a continuous belt, and the first rear conveyor comprises an interrupted belt.

7. The header of claim 1, wherein the first front conveyor comprises a first front auger having a helical respective operative surface.

8. The header of claim 7, wherein the first rear conveyor comprises a continuous belt or an interrupted belt.

9. The header of claim 1, further comprising:
   a second front conveyor attached to the frame and extending in the lateral direction between the second frame end and the feeder housing opening and behind the leading edge with respect to the forward direction, the second front conveyor comprising a second front movable surface configured to move an adjacent portion of crop material towards the feeder housing opening; and
   a second rear conveyor attached to the frame and extending in the lateral direction between the second frame end and the feeder housing opening and behind the second front conveyor with respect to the forward direction, the second rear conveyor comprising a second rear belt having a respective operative surface facing in the forward direction and configured to move an adjacent portion of crop material towards the feeder housing opening.

10. The header of claim 9, wherein the first front conveyor and the second front conveyor each comprises an auger or a belt.

11. The header of claim 1, wherein the first front movable surface comprises a front portion of a unitary belt, and the first rear belt comprises a rear portion of the unitary belt.

12. An agricultural vehicle comprising:
a chassis configured for movement on a surface;
a feeder housing having a proximal end mounted to the chassis and a distal end located in a forward direction from the proximal end; and
a header mounted on the distal end of the feeder housing, the header comprising:
a frame extending in a lateral direction from a first frame end to a second frame end, the frame having: a leading edge, and a feeder housing opening positioned behind the leading edge with respect to a forward direction and between the first frame end and the second frame end,
a first front conveyor attached to the frame and extending in the lateral direction between the first frame end and the feeder housing opening and behind the leading edge with respect to the forward direction, the first front conveyor comprising a first front movable surface configured to move an adjacent portion of crop material towards the feeder housing opening, and
a first rear conveyor attached to the frame and extending in the lateral direction between the first frame end and the feeder housing opening and behind the first front conveyor with respect to the forward direction, the first rear conveyor comprising a first rear belt having a respective operative surface facing in the forward direction and configured to move an adjacent portion of crop material towards the feeder housing opening,
wherein respective operative surfaces of the first rear belt and the first front belt are oriented at an angle of 90° to 135° relative to one another, as viewed along the lateral direction, and said angle is adjustable.

13. The agricultural vehicle of claim 12, wherein the first front conveyor comprises a first front belt having a respective operative surface facing in an upwards direction.

14. The agricultural vehicle of claim 13, wherein the respective operative surface of the first rear belt is located above the respective operative surface of the first front belt with respect to a vertical direction.

15. The agricultural vehicle of claim 12, wherein the first front conveyor is supported on a first roller positioned adjacent the feeder house opening and a second roller positioned adjacent the first frame end, and the first rear conveyor is supported on a third roller positioned adjacent the feeder house opening and a fourth roller positioned adjacent the first frame end, and wherein said first and third rollers are positioned at or near a same lateral position in the lateral direction and said second and fourth rollers are positioned at or near a same lateral position in the lateral direction.

16. The agricultural vehicle of claim 13, wherein the first front conveyor and the first rear conveyor each comprises a respective continuous belt.

17. The agricultural vehicle of claim 13, wherein the first front conveyor comprises a continuous belt, and the first rear conveyor comprises an interrupted belt.

18. The agricultural vehicle of claim 12, wherein the first front conveyor comprises a first front auger having a helical respective operative surface.

19. The agricultural vehicle of claim 18, wherein the first rear conveyor comprises a continuous belt or an interrupted belt.

20. The agricultural vehicle of claim 12, further comprising:
a second front conveyor attached to the frame and extending in the lateral direction between the second frame end and the feeder housing opening and behind the leading edge with respect to the forward direction, the second front conveyor comprising a second front movable surface configured to move an adjacent portion of crop material towards the feeder housing opening; and
a second rear conveyor attached to the frame and extending in the lateral direction between the second frame end and the feeder housing opening and behind the second front conveyor with respect to the forward direction, the second rear conveyor comprising a second rear belt having a respective operative surface facing in the forward direction and configured to move an adjacent portion of crop material towards the feeder housing opening.

21. The agricultural vehicle of claim 20, wherein the first front conveyor and the second front conveyor each comprises an auger or a belt.

* * * * *